United States Patent [19]
Laing

[11] 3,846,050
[45] Nov. 5, 1974

[54] CENTRIFUGAL PUMPS HAVING ROTATABLE POLE RINGS SUPPORTED IN CONTACTLESS BEARINGS

[76] Inventor: Nikolaus Laing, Hofener Weg 35-37, 7141 Aldingen bei Stuttgart, Germany

[22] Filed: Mar. 29, 1973

[21] Appl. No.: 346,114

Related U.S. Application Data

[62] Division of Ser. No. 97,771, Dec. 14, 1970, Pat. No. 3,732,445.

[52] U.S. Cl. ................................................. 417/420
[51] Int. Cl. ............................................. F04b 17/00
[58] Field of Search .................................... 417/420

[56] References Cited
UNITED STATES PATENTS

| | | | |
|---|---|---|---|
| 3,354,833 | 11/1967 | Laing | 417/420 |
| 3,438,328 | 4/1969 | Laing | 417/420 |
| 3,490,379 | 1/1970 | Laing | 417/420 |
| 3,649,137 | 3/1972 | Laing | 417/420 |
| 3,732,445 | 5/1973 | Laing | 417/420 |
| 3,741,690 | 6/1973 | Laing | 417/420 |

Primary Examiner—C. J. Husar
Attorney, Agent, or Firm—Pennie & Edmonds

[57] ABSTRACT

Centrifugal pump having a pole ring for producing a rotating magnetic field which drives a second rotatable pole ring which is connected to impeller blading where the second pole ring is axially supported with respect to the first pole ring by a fluid bearing film.

8 Claims, 3 Drawing Figures

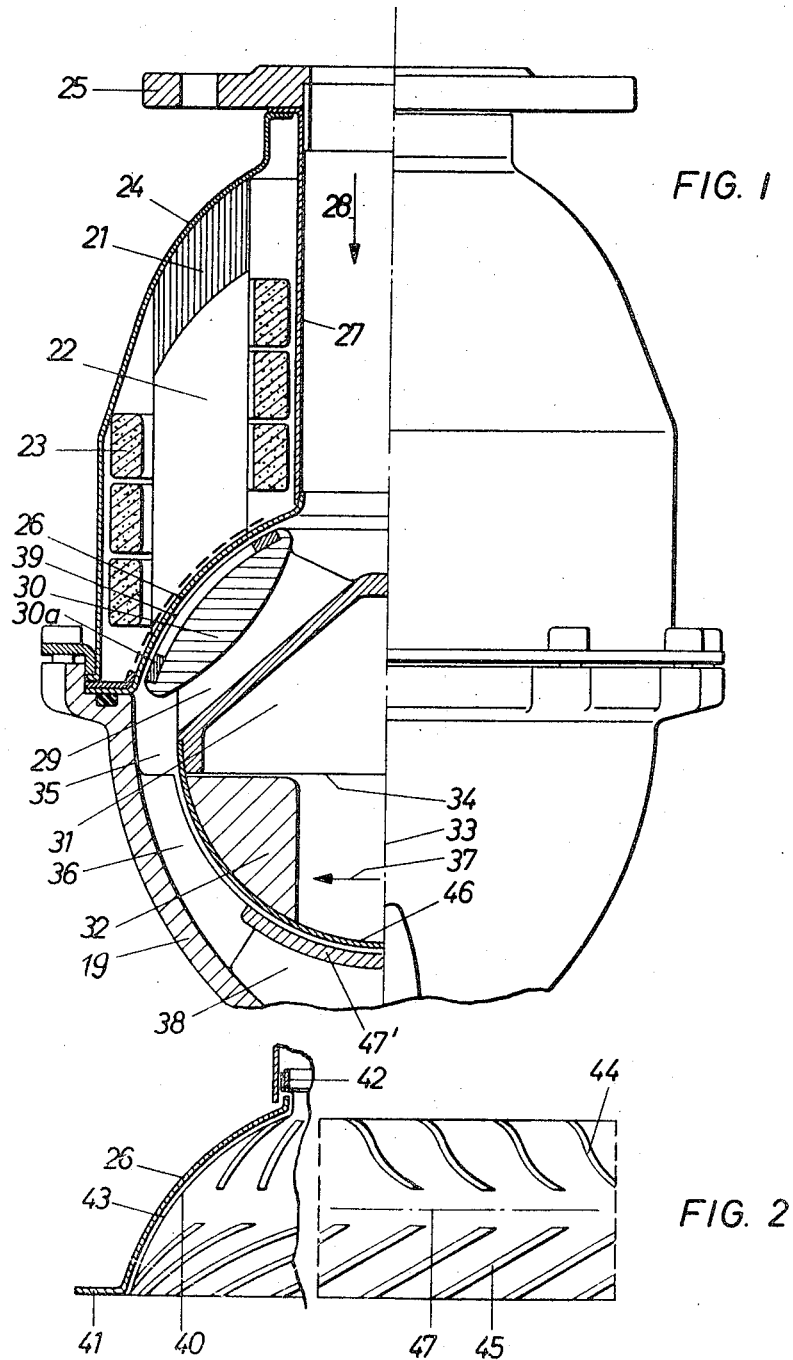

CENTRIFUGAL PUMPS HAVING ROTATABLE POLE RINGS SUPPORTED IN CONTACTLESS BEARINGS

CROSS-REFERENCE TO OTHER APPLICATIONS

This application is a division of my copending application Ser. No. 97,771 filed Dec. 14, 1970 and now U.S. Pat. No. 3,732,445.

BACKGROUND OF THE INVENTION

The invention relates to a bearing arrangement for axially and radially supporting a rotatable pole ring having impeller blades connected thereto that may be used in electrically driven centrifugal fluid pumps wherein the rotatable ring is magnetically coupled with a further pole ring acting as a driving member for the rotatable ring. An air gap separates the two pole rings and preferably is made as small as possible in the direction of the magnetic lines of force between the two pole rings.

The bearing arrangement for the rotatable pole ring of such a pump requires support in both the radial and axial directions. This is accomplished conventionally by mounting the rotatable pole ring on a shaft which is carried in fixed bearings such that the shaft is fixed coaxially with respect to the pump and whereby the pole ring mounted on the shaft rotates in a plane which is perpendicular to the major longitudinal axis of the pump.

Rotating magnetic machines, including centrifugal pumps, have been proposed in which a spherical bearing or pin bearing arrangement for mounting the rotatable pole ring replaces the shaft in order to provide a limited universal pivotal movement of the rotatable pole ring about the major longitudinal axis of the machine or pump. By suitably arranging the centers of the isodynamic lines of the poles comprising the driven and driving pole rings, the rotatable or driven pole ring may be stablized in such a way that it behaves like a rotor mounted in rigid bearings when the pole ring is undisturbed in its rotation. Axial movement of the rotatable pole ring in such machines is prevented by mechanical structure, such as a spherical bearing having spherical surfaces engaging each other or a pin engaging a support member. The pole pieces of such machines are spaced apart to form an air gap therebetween and the pole pieces have spherical surfaces the centers of which coincide with the spherical bearing such that the gap formed by the surfaces also has a spherical configuration. Rotating magnetic machines utilizing this construction, i.e. spherical or pin bearings, have for the most part been utilized with small machines. Where large machines are used, larger bearings are required which results in expensive and time-consuming machining in order to obtain convex and concave bearing surfaces within required tolerances. It is a purpose of the present invention to provide a hydrodynamic supporting bearing structure which may be used instead of the spherical bearing structure described above for large as well as small pumps having a pole ring which is pivotable about a major axis of a pump.

GENERAL SUMMARY OF THE INVENTION

Broadly the invention comprises utilizing the air gap formed by the surface of the poles as previously described as a bearing gap containing a fluid so as to provide contactless engagement between the poles. Means are provided for introducing a fluid under pressure into the bearing or air gap such that the pressure of the fluid is higher than the quotient of the axially directed vector of magnetic force and the projection of the magnetic region in the surface of rotation. The pressure of the fluid can be produced as by circumferential grooves, i.e. spiral grooves, or by means of auxiliary devices, i.e. a compressor, sufficiently to move the rotatable pole ring against the force of the axially directed vector of magnetic force acting between the pole rings tending to draw the rings together such that rotation of the rotatable pole ring takes place in a contactless manner. Liquids as well as gasses or a combination of the same are suitable for use as the fluid for producing the uninterrupted bearing film. The fluid is conveyed into the bearing gap along the periphery thereof by suitable means, i.e. spiral grooves, where the pressure of the resulting film increases considerably. At the same time, the liquid may be heated by suitable measures to such an extent that it evaporates so that the major part of the bearing film is made up of vapor. In this manner, the losses caused by sheer stresses of the liquid are considerably reduced. The heating of the liquid can be accomplished by utilizing materials of poor thermal conductivity for the surface layers of the pole rings or by inductively heating a separating wall contained in the air gap between the two pole rings.

In the event fluids of low kinetic viscosity are used for forming the bearing film, the resulting bearing gap should be very small. The smallest bearing gap which is achievable from a geometric view is the sum of the amounts by which the internal surface of a concave pole ring and an external surface of a convex pole ring deviate from the geometric bearing surface. With a view of reducing the high degree of tolerance necessary when small bearing gaps are used, the invention provides, if desired, for covering one of the pole surfaces with a thin layer and introducing a readily deformable liquid material between the layer and the pole surface. By this means, point contact of the two surfaces is avoided while at the same time an approximately constant bearing gap is achieved. Advantageously the bearing gap is formed in part between spherical surfaces lying on the pole rings such that the magnetic forces between the pole rings effect stablization of the geometric axis of the rotating pole ring.

Broadly centrifugal pumps constructed according to the invention comprise a first pole ring for producing a rotating magnetic field where the first pole ring includes a plurality of poles distributed over a surface part of which is inclined with respect to a major axis of the pump. A second rotatable pole ring which is driven by the first pole ring has the same number of poles as the first pole ring distributed over a second surface part of which is also inclined to the major axis of the pump and to the same degree of inclination as the first surface. The first and second surfaces of the first and second pole rings are spaced from each other to form a gap therebetween and where the gap acts to close the magnetic circuits of the adjacent poles to effect a magnetic coupling between the two pole rings. A separating wall is included in the gap by which the first pole ring is hermetically sealed from the second pole ring. Means are included for introducing fluid between the separating wall and the second pole ring in order to form a fluid bearing film whereby the second pole ring will be axially supported with resepct to the first pole ring. Impeller blading connected to the second rotatable pole ring exerts a force on the fluid when the ring is rotating to move the fluid through the pump.

DESCRIPTION OF THE DRAWINGS

FIG. 1 is a partial sectional view of a centrifugal pump constructed according to the invention having an axially extending fluid inlet;

FIG. 2 is an enlarged view of a portion of FIG. 1 illustrating in further detail the construction of the pump.

DETAILED DESCRIPTION OF THE PREFERRED EMBODIMENTS

Figure 3:
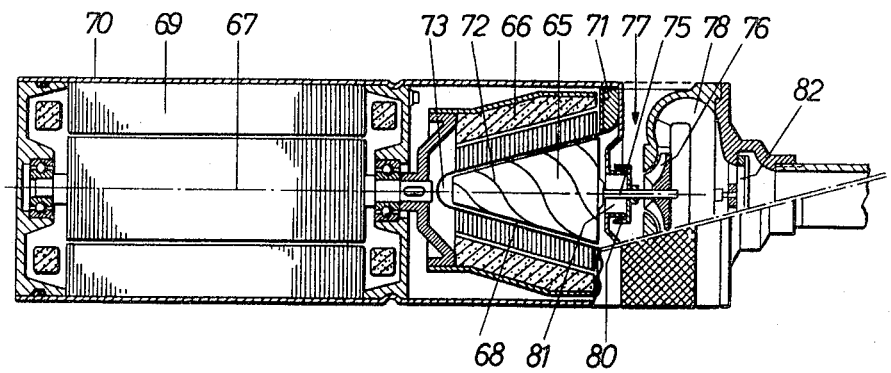
FIG. 3 is a sectional view of a further embodiment of a centrifugal pump constructed according to the invention having an axially extending fluid outlet.

Referring to FIG. 1, there is illustrated a centrifugal pump in axial section having a rotatable pole ring supported in a contactless bearing. A rotating magnetic field is adapted to be produced by a first pole ring 21 which comprises substantially coaxial sheet metal rings, preferably of a spiral construction, having slots 22 into which coils 23 are inserted which form a plurality of poles on the ring. A casing 24 of the pump merges into a flange 25 in the inlet side. This casing is also connected to a separating wall 26 on the pressure side of the pump around its perimeter. The flange and the separating wall are interconnected by a pipe 27 through which the input medium flows into the pump in the direction of arrow 28. The separating wall, casing and pipe together form a chamber containing the pole ring 21 and associated coils 23.

The impeller of the pump comprises a blade ring 29 mounted on a rotatable second pole ring 30 which comprises a soft magnetic material and which preferably carries a squirrel cage winding 30a similar to the rotor of an electric motor and which forms a plurality of poles on the ring. The reverse side of the blade ring has a cavity 31 which contains a heavy ring 32 which holds the impeller in equilibrium in the equatorial plane 34. The second pole ring, impeller blading and heavy ring together form a rotatable unit. The impeller also has in its lower surface facing away from the inlet side of the pump a curved surface 46 which coacts with a curved support surface 47' to form a bearing or second gap between the impeller and stationary parts of the pump when the pump is operating and which supports the impeller when the impeller is at rest.

The pole ring 21 acts as a drive means for the rotatable or driven pole ring 30 when the current is switched on. The ring 21 has concave inner surface and the ring 30 a convex outer surface which together form a first gap between the pole rings which gap in turn has spherical surfaces. Parts of the convex and concave surfaces of the rings are inclined with respect to major axis 33 of the pump. The gap serves in part to close the magnetic circuits between the adjacent magnetic poles.

Fluid leaves the impeller blades 29 and enters as a discharge swirl into the bladeless annular region 35 after which it is converted into a pressure rise by means of a guide blade ring 36. The blades of ring 36 convert the circumferential component 37 of the discharge swirl into a whirless axial flow which enters a pipe connection 38 on the pressure side of the pump and which is coaxial with the pump.

When the pump is initially started, the convex surface 39 of a blade lies in the concave surface of the separating wall 26 contained in the gap. A fluid bearing film of the fluid being pumped is formed in the gap by means of grooves 44, 45 shown in FIG. 2 which are contained on the surface of the foil forming part of the separating wall with the fluid entering into grooves 44 from the pipe 27 and into grooves 45 from the region 35. In this respect the grooves serve as a means to introduce fluid under pressure between the separating wall and the second pole ring. The thickness of this bearing film is dependent upon the circumferential velocity of the rotatable pole ring as well as the viscosity of the fluid being pumped such that the greater the velocity and viscosity, the greater the thickness of the film. The thickness of the film is also inversely proportional to the axial thrust exerted on the rotatable pole which thrust results from the magnetic attraction exerted between the pole rings 21 and 30 as well as hydraulic forces acting on the impeller exerted by the fluid being pumped. Depending on the point of operation, there is thus produced an equilibrium of forces which results in a stable and contactless rotation of the impeller, that is to say that the impeller is not physically contacting the separating wall 26.

The blades 36 are interconnected by wall 19 of hollow spherical form. This wall has the effect of maintaining the impeller comprising the blade ring 29, pole 30 and heavy ring 32 in a stable position after the electric current is switched off and when the impeller is at rest. The distribution of the masses, particularly of the pole 30 and heavy ring 32, is so chosen that the integral of the mass distribution miltiplied by the square of the diameter (moment of inertia) lying in the rotational plane is greater than that lying in other planes. This results in gyroscopic forces maintaining the impeller in a stable position after the current has been switched off and the impeller is still rotating and still subjected to continued magnetic and hydraulic forces.

FIG. 2 diagrammatically illustrates the spherical shaped separating wall 26 of FIG. 1 having thereon a plastic foil 40 comprising a material having low static friction properties. The foil 40 is secured in fluid tight manner along the periphery 41 of the separating wall and along the securing ring 42. A thin layer of liquid 43 which has deformable properties is inserted between the wall 26 and foil 40 and has the effect of making the specific compressive thrust per unit area of the foil 40 against the pole ring 30 uniform in all places.

Hydrodynamic bearing layer grooves 44 and 45 are provided on the foil 40 such that a fluid pressure will build up in the central region 47 when the pole 30 is rotated which pressure will lift the impeller off the foil and separating wall.

A further form of centrifugal pump constructed according to the invention is illustrated in FIG. 3. There a gap is formed between a rotor 65 and a rotating magnet or pole 66 where one side of the gap is defined by a surface of the magnet 66 which is inclined to the longitudinal or major axis 67 of the pump. The other side of the gap is defined by a surface of a rotatable or driven pole ring 65 the outer surface of which is in the form of a straight line 68 which is also inclined to the major axis 67 of the pump and to the same degree as the inclined surface of the pole ring 66. The gap thus formed comprises the curved surface of a truncated cone. The pole ring 66 is rotated by a motor 69 which in turn is contained within a casing 70 sealingly connected to a non-magnetic separating wall 71 contained in the gap. Thus the casing 70 and the separating wall form a hermetic chamber preventing the fluid being pumped from entering into the interior of the motor. As shown in the figure, grooves 72 are provided on the surface of the pole ring 65 which rotates anti-clockwise as viewed from the right. These grooves serve the same purpose as the grooves in FIG. 2 and act to produce a pressure within the chamber 73 and in the gap to overcome the magnetic forces acting between the pole rings tending to pull them together. The rotor 65 is mounted on a spindle 75 which in turn mounts an impeller 76 which has its intake in the direction of the arrow 77 and which may build up pressure in the concentric pump casing 78.

An annular cover 80 prevents the ingress of sand into the chamber 81 which communicates with the gap formed between the separating wall and the pole ring 65. A non-return valve 82 prevents reverse flow of fluid being pumped where the pump is positioned below a fluid distribution system, for example as may exist in fountains.

I claim:
1. A centrifugal pump having:
   a. a first pole ring for producing a rotating magnetic field where said first pole ring includes a plurality of poles distributed over a first surface thereof part of which is inclined with respect to a major axis of said pump;
   b. a second rotatable pole ring having the same plurality of poles as said first pole ring distributed over a second surface thereof part of which is inclined with respect to a major axis of said pump and to the same degree of inclination as said first surface, said first and second surfaces being spaced from each other to form a gap therebetween and the gap effecting a closure of magnetic circuits between adjacent poles;
   c. a separating wall in said gap for hermetically sealing said first pole ring from said second pole ring;
   d. means for introducing a fluid under pressure between said separating wall and said second pole ring to form a fluid bearing film to support the second pole ring axially with respect to said first pole ring; and
   e. impeller blading operatively connected to said second pole ring for imparting a force on a fluid to be pumped by said pump.

2. A centrifugal pump according to claim 1 having in addition an electric motor operatively connected to said first pole ring for rotating the same and casing means which join with said separating wall to form a hermetic chamber enclosing said motor and first pole ring.

3. A centrifugal pump according to claim 1 wherein said impeller blading is connected to said second pole ring by means of a spindle mounting an impeller body carrying the blading and wherein the fluid inlet sides of the blading face the second pole ring.

4. A centrifugal pump according to claim 3 wherein the pump has a fluid inlet extending radially into the pump adjacent the inlet sides of said blading and a fluid outlet extending coaxially outwardly of the pump on the side opposite the impeller body from the second pole ring.

5. A centrifugal pump according to claim 1 wherein said first pole ring is stationary and comprises an annular body having thereon a winding which body and winding are hermetically sealed in part by said separating wall, wherein the inlet for the pump passes axially through said annular body, and wherein said second pole ring mounts said impeller blading.

6. A centrifugal pump having:
   a. a first pole ring for producing a rotating magnetic field where said first pole ring includes a plurality of poles distributed over a first surface thereof part of which is inclined with respect to a major axis of said pump;
   b. a second rotatable pole ring having the same plurality of poles as said first pole ring distributed over a second surface thereof part of which is inclined with respect to a major axis of said pump and to the same degree of inclination as said first surface, said first and second surfaces being spaced from each other to form a gap therebetween and the gap effecting a closure of magnetic curcuits between adjacent poles;
   c. means for introducing a fluid under pressure between said first pole ring and said second pole ring to form a fluid bearing film to support the second pole ring axially with respect to said first pole ring; and
   d. impeller blading operatively connected to said second pole ring for imparting a force on a fluid to be pumped by said pump; and
   e. an inlet for the pump passing axially through said first pole ring, so that the magnetic attracting forces between the pole rings and the hydraulic forces both draw the second pole ring against the first pole ring.

7. A centrifugal pump having:
   a. A first pole ring for producing a rotating magnetic field where said pole ring includes a plurality of poles distributed over a first surface thereof part of which is inclined with respect to a major axis of said pump;
   b. A second pole ring having the same plurality of poles as said first pole ring distributed over a second surface thereof part of which is inclined to the same degree of inclination as said first surface, said first and second surfaces being spaced from each other to form a first gap therebetween and the first gap effecting a closure of magnetic circuits between adjacent poles;
   c. Impeller blading operatively connected to said second pole ring for imparting a force on a fluid to be pumped by said pump;
   d. A heavy ring operatively connected to said second pole ring having a curved surface thereon and where said heavy ring, impeller blading and second pole ring together form a rotatable unit;
   e. A curved support surface opposite said curved surface and spaced therefrom when said pump is running by a second gap;
   f. An inlet of said pump passing axially through a part of said rotating unit; and
   g. Means for introducing a fluid under pressure into a gap which is situated on the same side as the inlet to form a fluid bearing film to support said rotatable unit axially with respect to said first pole ring.

8. A centrifugal pump according to claim 7 wherein said inlet passes axially of the second pole ring and where the means for introducing a fluid under pressure introduces the fluid into said first gap whereby the rotatable unit is supported axially with respect to said first pole ring against the magnetic and hydraulic forces tending to move the rotatable unit towards the first pole ring.

* * * * *